Oct. 16, 1928.  1,688,232
J. P. HARKIN
MEANS FOR MOLDING RUBBER DRAINING BOARDS FOR SINKS
Filed July 2, 1926   3 Sheets-Sheet 1
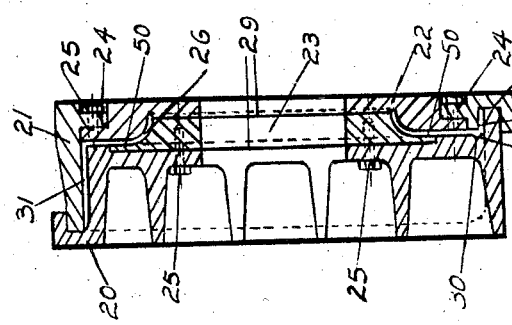
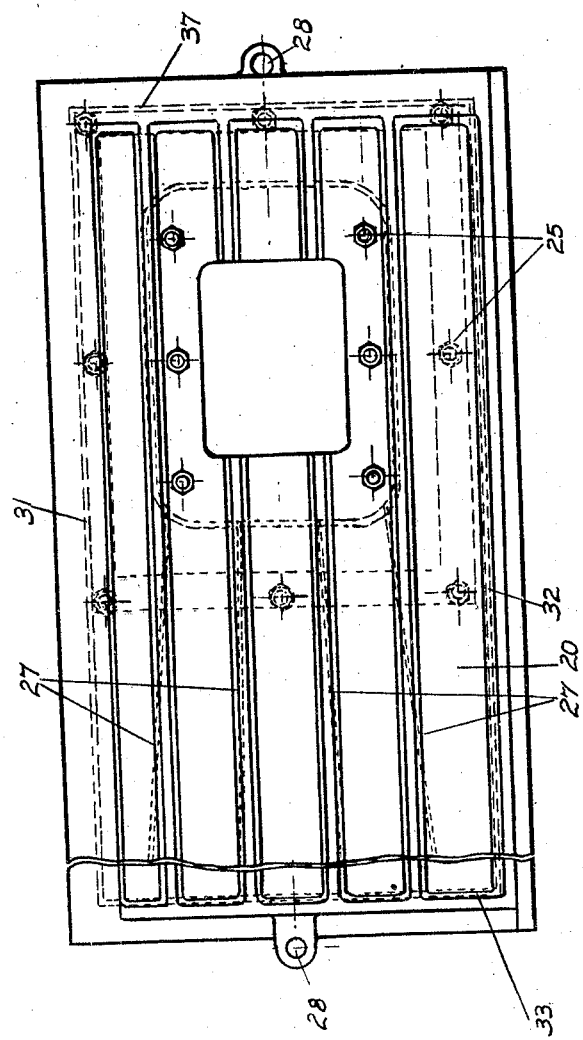
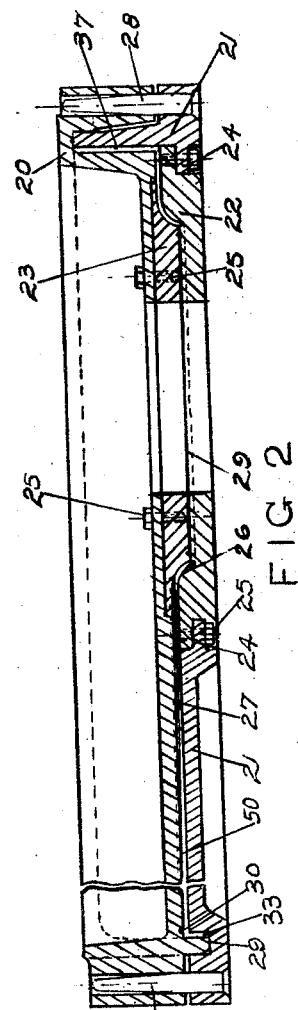
INVENTOR
JAMES P. HARKIN
BY
ATTORNEYS

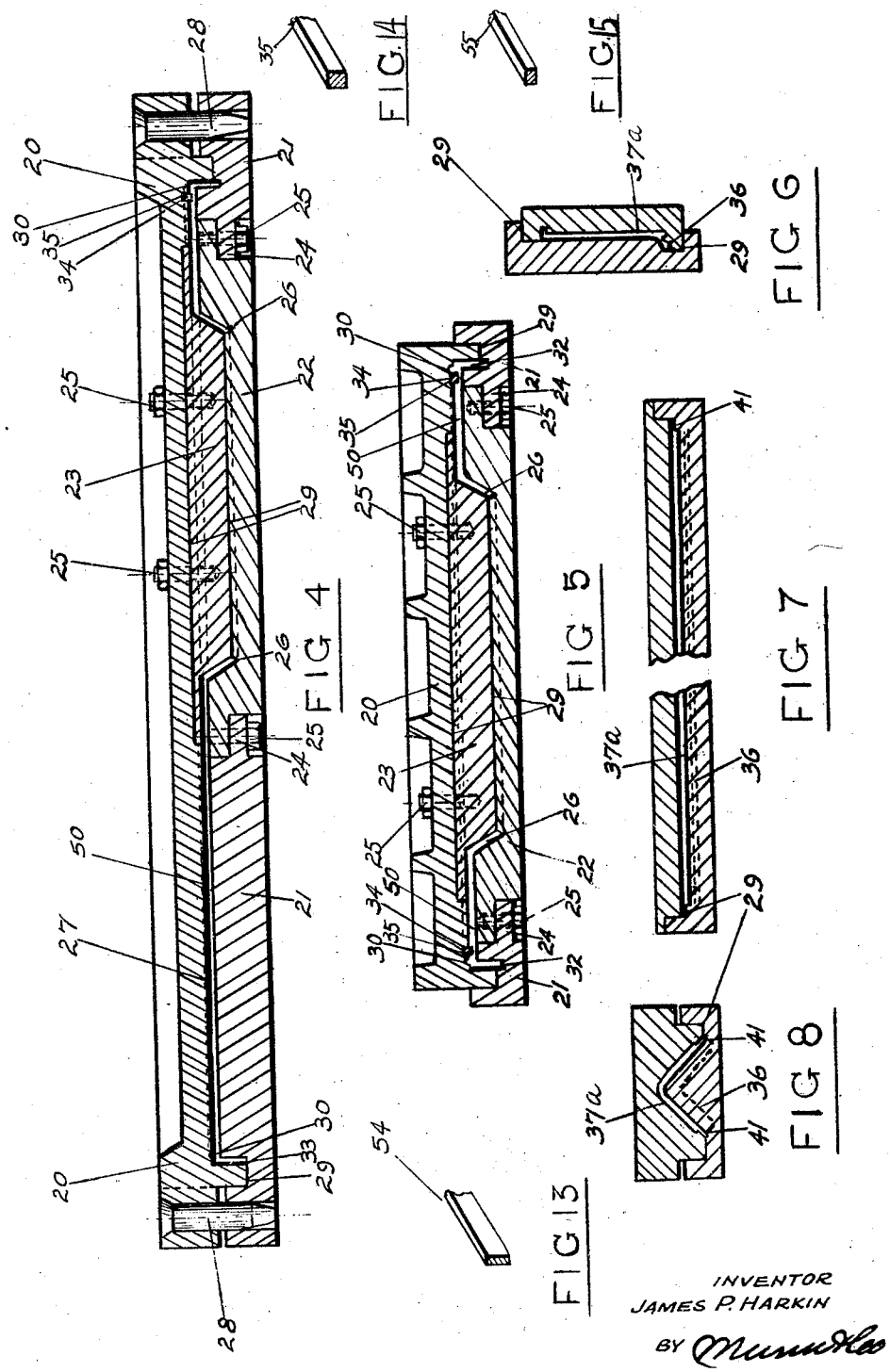

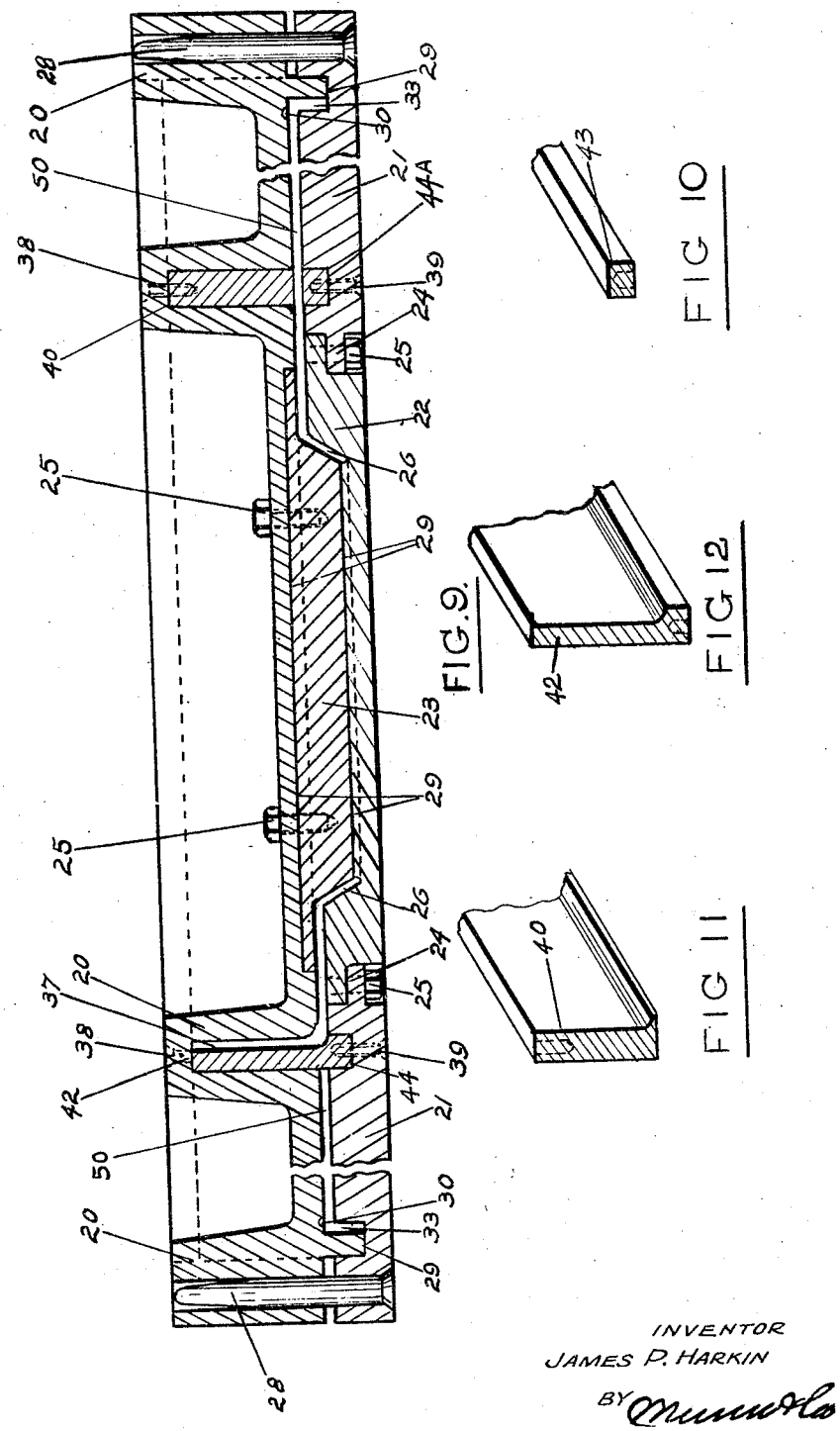

Patented Oct. 16, 1928.

1,688,232

UNITED STATES PATENT OFFICE.

JAMES PAUL HARKIN, OF THORNBURY, AUSTRALIA.

MEANS FOR MOLDING RUBBER DRAINING BOARDS FOR SINKS.

Application filed July 2, 1926. Serial No. 120,162.

My invention relates to improvements in the production of rubber draining boards for sinks and means for molding the same and generally for preventing the unsanitary condition of sinks and receptacles. The words "rubber draining boards" when used in this specification refer to an article cast or formed by molding or pressing rubber or composition and having special qualities and advantages hereinafter referred to. An object of the invention is to produce economically different efficient rubber draining boards by means of one apparatus with adjustments to vary the size and shape of the boards. Another object of the invention is to produce rubber draining boards with a sink well either oval, square, oblong or other shape. Another object is to produce rubber draining boards having the major portion on the right or left hand of the well. A right hand board means a board in which the main area is on the left hand from the point of view of the onlooker. Another object concerns the provision of means whereby all the parts of the apparatus can be easily assembled for operation and dismantled for alterations. In all of these respects the means and method of molding are hereinafter fully explained. With the above and other objects in view the invention consists in general of certain novel points of construction and combinations of parts hereinafter fully described and illustrated in the accompanying drawing and specifically claimed.

The invention relates particularly to draining boards to be formed of rubber, or like material akin to rubber, as applied to household or industrial sinks or like appliances.

In all cities and places where water supply service is available there is extensive use made of means and appliances for washing, cooking and other purposes, and for carrying away the waste water by means of sinks and pipes. In a great majority of cases a draining board is used in connection with such sinks, being formed of an oblong or square or other tray shape and composed of wood boards, or partly of wood and partly of other material. The term "rubber draining board" as herein applied to the product of this invention must be distinguished from the wood or other boards at present joined together in use for sinks, and which on account of their unsanitary effects are to be superseded. It is well known in connection with such constructions around sinks and the like that through constant wetting the component wood boards or parts become more or less warped, and consequent thereon conditions become unsanitary owing to moisture and dirt accumulating under and between the adjacent walls and in crevices and framing, thereby requiring in some positions the unsightly and inconvenient use of lead flashing or other troublesome expedients as a cure or preventive. It will be understood that in research laboratories where acids are handled my rubber draining board or sink cover becomes especially valuable in overcoming the difficulties described.

My invention relates to a sink top or drain board so formed and molded of a resilient and moldable material such as rubber or of a like material akin to rubber that it will prevent or minimize the objectionable and unsanitary conditions heretofore described. The new rubber draining board is made in forms either right or left hand pattern, or both, with all necessary grooves leading in angular or other direction to the sink well. There is attached or attachable for the top of the sink a narrow molded skirting of rubber integral with the draining board and turning at right angle in a continuous upward direction and constituting or providing a close joint around those parts of the wall which it is in contact with. The other end and the front (not in contact with the walls) are molded with skirting in a downward direction so that they fit on to and over any framing employed. The rubber draining board is so molded that it turns in a downward direction into the well in one continuous lip making a close shield against the sides of the sink well and thereby rendering it impossible for any moisture or dirt to collect thereunder.

The invention may be manufactured in various colors to tone with other surroundings and in various sizes to suit sinks of different sizes. It will be understood however that a large proportion of the drain boards can be fashioned to usual standard style and stocked by merchants accordingly with great advantage to all concerned. As it is necessary to have the rubber draining boards produced with the major portion of the same sometimes on the right or sometimes on the left hand side of the sink well or sometimes with the well centrally situated provision is made to economically produce my rubber draining board for all three positions.

In the accompanying drawings like characters of reference indicate like parts in the several views.

Figures 1, 2, 3 are respectively plan view, longitudinal cross section and transverse cross section of the upper and lower dies or molds.

Figures 4 and 5 are respectively longitudinal and transverse cross sections of a modification of the dies adaptable for molding either right or left hand boards.

Figures 6 and 7 respectively are transverse and longitudinal cross sections of mold for producing as separate pieces the skirtings.

Figure 8 is a cross section of the mold for producing as separate members the corner pieces of the wall skirtings.

Figure 9 is a modification of my combination mold in longitudinal cross section for the production of right hand, left hand or even handed boards.

Figures 10, 11, 12, 13 and 14 and 15, show sections of detachable stop bars which are used in combination with the dies for filling in when desired the cavity spaces of the molds.

The apparatus will now be described. The cavities 31 and 37 (see Figure 1) represent the spaces in which are cast the back and end skirting integral with the rubber draining board; the cavities 32 and 33 represent the spaces in which are cast the front and end skirting which fits over the usual framing on which boards are mounted; cavity 26 is the space wherein the rubber is cast for the skirting that extends into the sink well; cavity 50 represents the space wherein is formed the table-like rubber carrying the drainage grooves 27.

I have for the sake of convenience in description designated the form of mold illustrated in Figure 1, a left hand mold, from the fact that the wall cavities shown by numerals 37 and 26 are located to the right of such mold. In further reference when these cavities (numerals 37 and 26) are located to the left, such mold will be referred to as a right hand mold and when the cavity 26 is located central the mold will be referred to as a central or even-handed mold.

It will be seen that my invention provides the means of producing the three above referred to forms of drainage boards, but in addition to such, it also provides means for producing the boards separate from their skirtings and in such convenient form that the board and the skirting may be cemented or otherwise conveniently combined together and thus form one unit.

The form of mold illustrated by Figures 1–3 is adapted for making left hand draining boards with all parts integral, whereas the mold illustrated in Figures 4 and 5 is for making a board without the skirtings, the skirtings being separately made and subsequently cemented, or otherwise conveniently joined in position to form a complete board unit; the molds being adaptable, as hereinafter described to form either right or left hand boards; whereas the modified form of apparatus illustrated in Figure 9, is capable of producing boards right, left or central or even handed with all skirtings and edgings molded integral therewith.

Referring now to Figures 1 to 3 the numerals 20—21, represent respectively the top and bottom dies of the mold, which, are made of metal, as also are all other parts of the apparatus. In order to accommodate the mold to the manufacture of boards with various size and shape sink openings or wells detachable sections 23, 22, are secured to the main top and bottom portions respectively by means of the screws or studs 25, suitable lugs 24, being formed on the lower part of the main mold for convenience of attachment and the detachable sections 22, 23, being of various sizes and shapes to form various openings. It will be seen that when the upper and lower molds are registering together as illustrated, cavities or spaces 31, 32, 33, 37, 50 are formed which serve to receive and retain a layer of the plastic rubber so that when the mold is subjected to pressure and heat such rubber will be molded and pressed to shape in conformity with the contour of these cavities. The cavity 31 will thus form the back skirting; cavity 37 the end skirting, cavity 26 the lip or sink skirting. The cavities 32—33 form the skirting that covers any framing while the main cavity 50 between the two mold portions forms the flat or table-like surface of the board. Raised beads 27 are formed on or attached to the surface of the main upper mold in order to form the customary drainage grooves and the top and bottom molds are made to register one with the other by means of the dowel pins 28.

Referring now to Figures 4, 5, which illustrate mold for forming boards with wall skirtings separate instead of integral therewith, it will be seen that the main parts of such mold are identical with those hereinbefore described in reference to Figures 1–3, but that the recesses or cavities 31—37 are absent. It will be seen that recess 34 extends on three sides of the mold for receiving rectangular bars 35 held in the upper mold by pins or set screws the function of such bars being to form a longitudinal groove or depression on the edge of the upper surface of the molded board such groove serving to receive the wall skirtings which are formed as separate pieces and joined to the board by suitable cement. It will also be seen that the cavities 32 and 33 for receiving the skirting that covers the framing extend completely around the mold; and loose metal bars 54 (Figure 13) are used for inserting in position in the mold so as to block up the cavities as required, and thus form the board with edgings on only such sides as desired; furthermore half bars 55 (Figure 15) are provided for blocking up such parts of the recess 34 flush with the face of the cavity 50 as desired, so that beads will only be formed on the face edgings of the molded board where not required for receiving the loose wall skirtings. The mold for forming the loose wall skirtings is shown in Figures 6–8 in which as in all other figures 29 denotes the parting line between the two halves of the mold, 37ª the cavity between the molds which forms the plastic rubber into shape in conformity with its contour, in such manner as with a toe piece 36 which is dimensioned to fit into the grooves formed by the bars 35 on the surface edging of the molded board, and thus facilitates the cement joining of such edging to the board. It will be seen that by the combination mold described particularly with reference to Figures 4 and 5, a draining board of any hand can be manufactured, that is to say by the use of the bars 54, the edging is caused to be molded only on the edges as required, and by the use of the half bars 55 (Figure 15) and the full bars 35 (Figure 14) the recess for receiving the wall skirting is only formed in the position required. The mold shown in Figure 8 is for the purpose of forming corner pieces for joining the back or end pieces of the loose wall skirting, and it will be seen that such mold will produce pieces with scarfed edges 41 and toe pieces 36 illustrated in Figure 6, the scarfed edges being subsequently cement joined to corresponding scarfed edges of the loose wall skirting so that the result is a flush finish.

Referring now to Figure 9 which illustrates a combination mold adapted to form either right left or central handed boards with skirtings and edgings integral, it will be seen that as illustrated the cavities would mold the rubber with skirting and sink hole located to the left, it will also be seen that bars 40, 42, and 43 determine the shape of the cavities for receiving the plastic rubber. The bars 40, 42, 43 are secured in position by the screws or pins 38, 39, 39ª, respectively as clearly shown. When it is desired to form a board with wall skirting and well sink located to the right the bars 40, 43 are placed in the position and instead of the single bar 42 as illustrated the bar 42 is put in the position vacated by 40 and 43; that is the position of the bars is reversed.

In manufacturing an even handed board the bar 42 is not used at all. Four bars are used namely two such as that numbered 40 and two such as that numbered 43 and thus the flow of the rubber is permitted so as to form a rubber draining board with well centrally situated.

In operation the rubber composition stock is taken from the calender in a semi-plastic state and of the desired thickness and is cut to the approximate shape to fit a template of the finished article. The mold is warmed up by placing between steam jacketed platens and the shaped rubber placed on the lower half die, the top half is forced into position by hydraulic pressure being guided into position by the dowel pins which cause the rubber when it comes in contact with the heated metal to become more plastic and flow and spread into the particular shapes desired according to the way the stop bars are arranged. Other procedure in operation may be performed according to known practice in the art.

The form of the invention shown in the drawings is a preferred form, although it is understood that modifications in the construction and arrangement of the parts and in the character of the materials used may be adopted without departing from the spirit of the invention as set forth in the appended claims.

My rubber draining board is mounted upon any suitable frame either such as now employed or portable or otherwise.

I claim:

1. Means for forming drain boards of rubber or the like, comprising two molds having registering openings to form a sink opening and provided with means for forming in the upper surface of the board drain grooves leading to said opening, and means associated with the molds whereby to form right hand, left hand, or even hand boards.

2. In means for forming drain boards of rubber or the like, two molds provided with means, whereby to form a drain opening or well in the mold of different shapes and sizes, said means comprising detachable apertured sections.

3. In molding apparatus for rubber sink draining boards an upper mold and a lower mold having apertures therein adapted to produce a draining board with a sink well and cavities, and a plurality of stop bar plates adapted to be attached between certain parts of the molds for the purpose of varying the shape of the cavities according to the type of draining board required to be produced.

4. In molding apparatus for rubber draining boards an upper mold and a lower mold having apertures therebetween and adapted to produce a rubber draining board, means whereby the mold on the top is adjustably secured to the mold at the bottom, a plurality of removable stop bar plates adapted to be attached between certain parts of the molds, whereby by the attaching or omission of said bars right hand sink draining boards, left hand sink draining boards, or even hand sink draining boards can be formed by the same apparatus.

5. In molding apparatus for rubber sink draining boards a pair of molds having longitudinal registering apertures adapted to produce a sink well or opening and provided with horizontal surface beads for forming grooves draining to the well and with cavities extending along one side and one end of the molds to form flanges for the board.

6. In molding apparatus for rubber sink draining boards a pair of dies having longitudinal openings therebetween to form a sink well and provided with horizontal surface beads to form grooves for draining to the well and a mold for forming a rubber skirting for one side and one end of the draining board, said skirting being adapted to be secured by cement or other means to the rubber sink draining board.

7. In the production of rubber draining boards a mold having a skirting cavity at one end and a horizontal cavity and a bar which closes the skirting cavity against the flow of the heated rubber thus directing the rubber horizontally along cavity to produce a rubber draining board without skirting substantially as described.

8. In the production of rubber draining boards of the character described a mold having cavities and recesses, two bars in the recesses for determining the shape of the cavities, and a bar closing the recess that holds said bars thus directing the heated rubber along the cavity for the purpose of forming the table portion of the rubber draining board substantially as described.

9. In a mold for molding drain boards of rubber or the like, two superimposed mold members having interchangeable and apertured sections, and means for attaching said sections to the mold members one above the other with their apertures registering, whereby drain boards with drain openings or wells of various sizes and shapes can be made.

10. Means for molding drain boards of rubber or the like, comprising two mold members, said members having means for forming the band with or without marginal flanges, with drain grooves, and with sink openings or wells of various sizes and shapes.

In witness whereof, the said JAMES PAUL HARKIN, has hereunto set his hand this 2nd day of June, 1926.

JAMES PAUL HARKIN.